No. 768,095. PATENTED AUG. 23, 1904.
T. E. TWIST.
ADJUSTABLE NOZZLE.
APPLICATION FILED MAY 15, 1903.
NO MODEL.
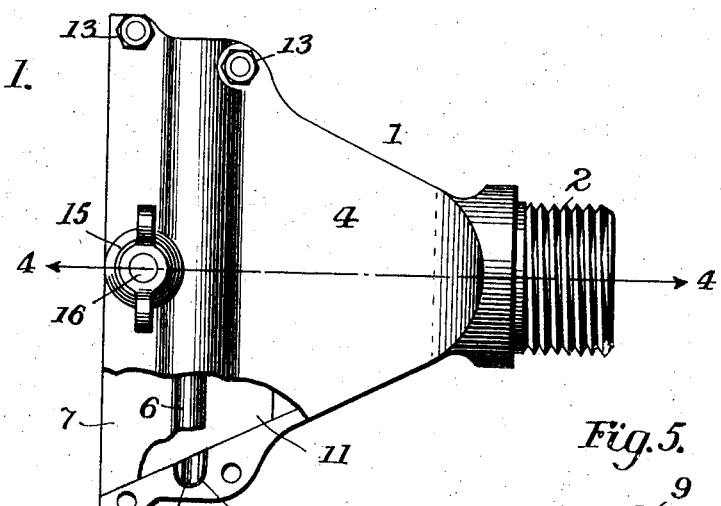
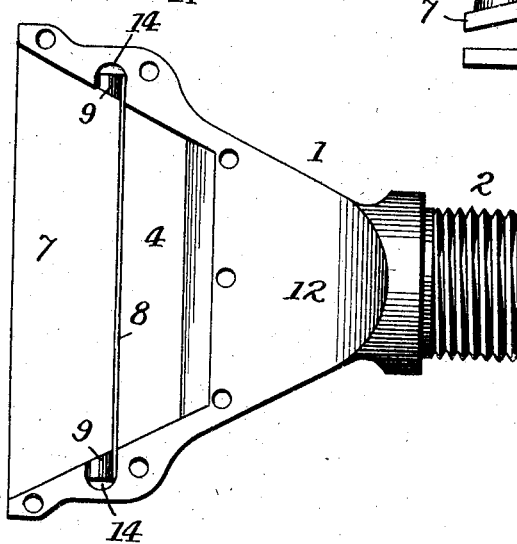
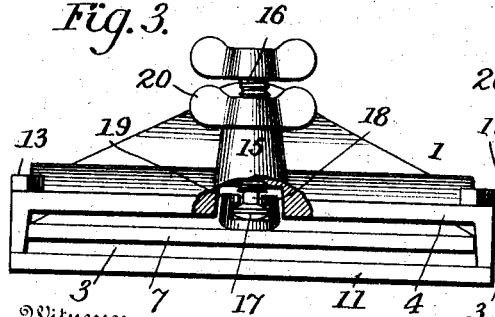
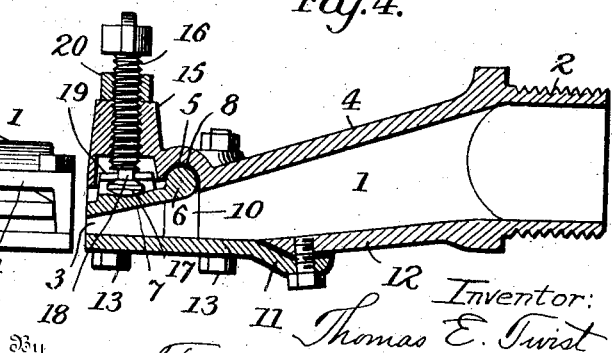
Inventor: Thomas E. Twist No. 768,095.

Patented August 23, 1904.

UNITED STATES PATENT OFFICE.

THOMAS E. TWIST, OF MILTON, PENNSYLVANIA.

ADJUSTABLE NOZZLE.

SPECIFICATION forming part of Letters Patent No. 768,095, dated August 23, 1904.

Application filed May 15, 1903. Serial No. 157,285. (No model.)

*To all whom it may concern:*

Be it known that I, THOMAS EDWARD TWIST, a citizen of the United States, residing at Milton, in the county of Northumberland, State of Pennsylvania, have invented certain new and useful Improvements in Adjustable Nozzles, of which the following is a specification.

This invention comprises improvements in nozzles adapted to throw water in a flat stream or to spread it laterally, the object of the invention being to produce a nozzle which may be adjusted to regulate the thickness of the stream.

Referring to the accompanying drawings, Figure 1 is a top plan view of a nozzle embodying my invention. Fig. 2 is a bottom plan view of the same. Fig. 3 is a front view partly broken away. Fig. 4 is a section on the line 4 4, Fig. 1; and Fig. 5 is a detail.

Referring to the drawings, 1 indicates the body of the nozzle, which may have a threaded shank 2 or other suitable coupling for attaching it to a pipe or hose. The body is round at one end and flat at the other, being generally fan-shaped, the opening gradually decreasing in height and increasing in width toward the outlet 3. The top or upper wall 4 of the nozzle is formed near its forward or outlet end with a transverse groove or channel 5 in its under surface, which forms a seat for the pivot 6 of the plate or apron 7, which forms the adjustable part of the nozzle. Between the seat 5 and the rib 6 is preferably placed a strip of packing material 8 to prevent leakage. The adjustable plate 7 has lateral extensions or trunnions 9, which rest on bearings 10, which are connected to the removable portion 11 of the lower nozzle-wall 12. The bearings 10 are preferably cast integral with the plate 11, and said plate is connected to the nozzle by suitable bolts or screws 13. By removing the plate 11 the plate 7 may also be readily removed. The bearing-posts 10 are let into recesses 14 in the side walls of the nozzle and do not obstruct the flow of fluid through it.

As illustrated, the plate 7 is adjusted by the following means: The upper wall 4 is formed with a boss or projection 15, through which passes an adjusting-screw 16. The lower end of the screw is provided with a head 17 and a neck 18. The head fits within a slot in a boss upon the upper side of the adjustable plate 7, and flanges 19 on said boss engage the upper side of the head. The screw thus connected is adapted to adjust the plate 7 positively up and down to open and close the mouth of the nozzle. A lock-nut 20 is provided to lock the nozzle in any desired adjustment.

The different parts of the nozzle may be quickly taken apart and put together, thus providing for ease and cheapness of manufacture and for cleaning, if necessary. With the exception of the screws and bolts all of the parts may be cast. The adjustment provides for a stream equal to the maximum opening of the nozzle and also for any desired opening less than the maximum.

It will be seen that the adjustable part of the nozzle is entirely within the casing or body, and thus protected from breakage. It will also be seen that in any degree of adjustment there is no obstruction to the smooth and rapid flow of the water and other fluid within the nozzle.

Having thus described the invention, what I claim, and desire to secure by Letters Patent, is—

1. A nozzle comprising fan-shaped upper and lower walls, a plate for adjusting the opening of the nozzle, and means for adjusting said plate, the said plate being arranged between said upper and lower walls, having a pivotal seat in one of said walls and having bearings connected with the other wall.

2. A nozzle comprising fan-shaped upper and lower walls, a plate pivotally mounted within said walls, and an adjusting-screw for adjusting said plate to open and close the outlet of the nozzle, one of said walls having a lateral groove in its inner side to form a seat for the pivotal edge of said plate, and the other wall having projections adapted to hold said plate in engagement with said seat or recess.

3. A nozzle comprising upper and lower fan-shaped walls, forming an elongated outlet, a plate pivotally connected to one of said walls and adapted to vary said outlet, a removable portion 11 forming part of the other wall and provided with supports for the pivotal edge of said plate, said supports being located within recesses in the side walls of the nozzle, and means for adjusting said plate to vary the nozzle-outlet.

4. A nozzle provided with an upper fan-shaped wall having a lateral groove or seat 5, an adjusting-screw 6, a plate 7 connected with said adjusting-screw and having a pivotal rib seated in said groove 5 and trunnion extensions on said rib, and a removable lower plate 11 having bearings 10 fitting in recesses in the side walls of the nozzle and coöperating with the said trunnions to hold the said rib in its seat.

In testimony whereof I have signed my name to this specification in the presence of two subscribing witnesses.

THOMAS E. TWIST.

Witnesses:
I. M. CALDWELL,
EDWIN PAUL.